United States Patent [19]

Poppendiek et al.

[11] 4,003,250

[45] Jan. 18, 1977

[54] GEOTHERMAL HEAT FLUX TRANSDUCERS

[75] Inventors: Heinz F. Poppendiek, La Jolla; Paul T. Meckel, Lakeside, both of Calif.

[73] Assignee: Thermonetics Corporation, San Diego, Calif.

[22] Filed: Sept. 8, 1975

[21] Appl. No.: 611,532

Related U.S. Application Data

[63] Continuation of Ser. No. 532,925, Dec. 16, 1974, abandoned.

[52] U.S. Cl. .............................. 73/190 H; 73/154
[51] Int. Cl.² ...................................... G01K 17/00
[58] Field of Search .......... 73/15 R, 190 R, 190 H, 73/154

[56] References Cited

UNITED STATES PATENTS

| | | | |
|---|---|---|---|
| 2,403,704 | 7/1946 | Blau | 73/154 |
| 2,493,651 | 1/1950 | Boelter et al. | 73/190 |
| 2,798,377 | 7/1957 | Brownlee et al. | 73/190 |
| 3,059,471 | 10/1962 | Calvet | 73/190 |
| 3,165,915 | 1/1965 | Parker et al. | 73/154 |
| 3,199,352 | 8/1965 | Macatician | 73/190 |
| 3,247,714 | 4/1966 | Schwabe et al. | 73/190 |
| 3,526,123 | 9/1970 | Putman et al. | 73/15 |
| 3,714,832 | 2/1973 | Howell | 73/154 |
| 3,808,889 | 5/1974 | Rawson | 73/154 |

*Primary Examiner*—Herbert Goldstein
*Attorney, Agent, or Firm*—Lyon & Lyon

[57] ABSTRACT

A geothermal heat flux transducer includes a plurality of insulating slats on which constantin wire is wound and each half turn is coated with a silver layer to produce a hot junction and a cold junction per turn of wire. The slat with wire thus coated is assembled with insulating material between adjacent slats such that silver coatings on adjacent slats face each other and also uncoated wire half turns on adjacent slats face each other. This allows a multiplicity of thermal junctions thus formed to be assembled in a small package which may be suspended in earth bore holes in mine shafts or otherwise below or above ground for measurement of heat flow emanating from sources far below the earth's surface. Variable heat flow occasioned by diurnal and/or seasonal variations are accounted for in ascertainment of that steady heat flux flowing from geothermal sources alone. The transducer is of special dimensional proportions with parts specially related both structurally and thermally.

20 Claims, 8 Drawing Figures

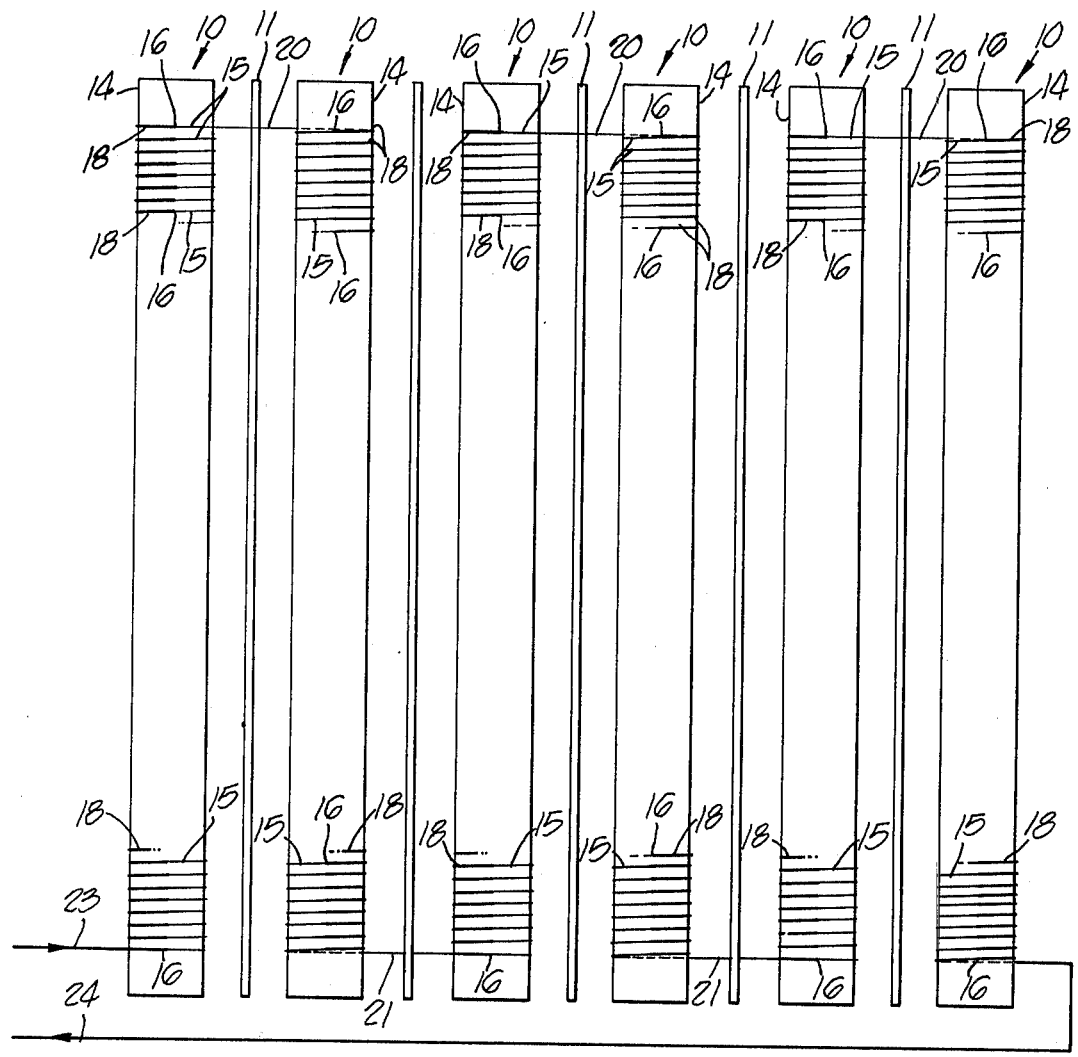
FIG. 5.
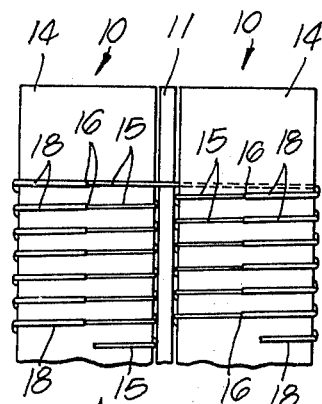
FIG. 6.
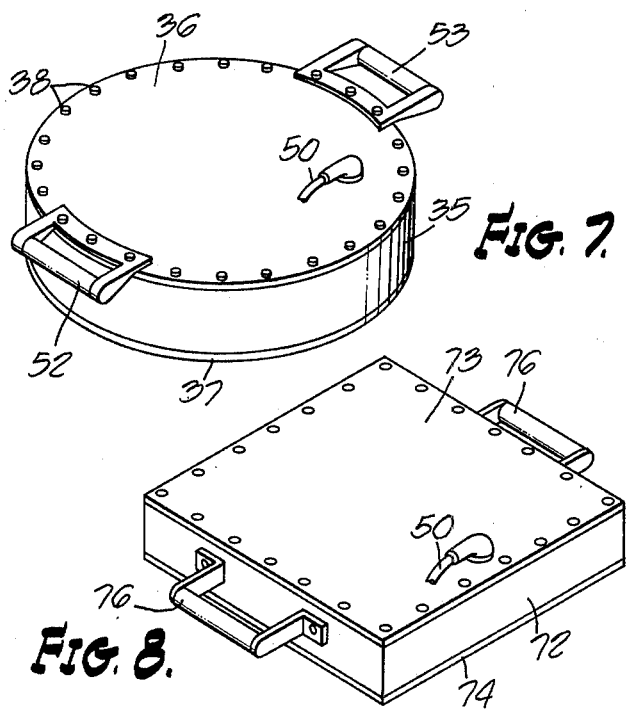
FIG. 7.
FIG. 8.

GEOTHERMAL HEAT FLUX TRANSDUCERS

The present application is a continuation in part of our U.S. patent application, Ser. No. 532,925, filed Dec. 16, 1974, now abandoned and assigned to the same assignee.

The present invention relates to improved means and techniques for measurement of heat flow from a source far below the earth's surface.

An object of the present invention is to provide an improved heat flux sensor or transducer particularly useful in developing an electrical output responsive to heat flow from geothermal sources.

Another object of the present invention is to provide an improved geothermal heat flux sensor using novel techniques whereby a multiplicity of thermal junctions may be included in a small package adaptable for use either on the earth's surface or below the earth's surface in, for example, bore holes or mines or on the ocean floor.

Another object of the present invention is to provide improved means and techniques whereby meaningful readings of geothermal heat flux may be obtained in electrical form without the necessity of drilling a bore hole.

Another object of the present invention is to provide an improved geothermal heat flux transducer which is direct reading.

Another object of the present invention is to provide improved means and techniques for obtaining measurement of geothermal heat flux with such measurements being relatively insensitive to diurnal and seasonal variations.

Another object of the present invention is to provide improved means and techniques for measurement of heat flux and which obviates the necessity of spaced thermistors, the obtainance of core samples and measurements of thermal conductivity of such core samples, as was necessary in prior art practice in attempted measurement of geothermal heat flux.

Another object of the present invention is to provide improved means and techniques whereby geothermal heat flux may be measured more simply and accurately.

Another object of the present invention is to provide an improved heat flux transducer which obviates the necessity of making temperature differential measurements at different depths below the earth's surface.

Another object of the present invention is to provide an improved heat flux transducer which is particularly useful in measurement of heat flux through ocean, lake and river beds.

Another object of the present invention is to provide an improved heat flux transducer which may be accurately calibrated to measure heat flux directly without, for example, utilizing the cumbersome technique of measuring a bed temperature gradient and then determining the heat flux by multiplying this gradient by bed thermal conductivity determined independently.

Another object of the present invention is to provide an improved heat flux measurement system which may involve a large number of small, flat heat transducers which when thus used, has the advantage of being able to conform to rough ocean, lake or river bed bottoms, with the advantage that the system involving large surface areas then automatically yields an average flux value.

Another object of the present invention is to provide an improved geothermal heat flux transducer which requires no external power source, with the electrical output of the transducer being applied to a simple current or voltage-measuring means.

Another object of the present invention is to provide an improved geothermal heat flux transducer which has a relatively small thermal resistance compared to, for example, ocean, lake or river bed thermal resistance.

Another object of the present invention is to provide an improved geothermal heat flux transducer which includes a large number of thermopile junctions extended over a large area to produce a meaningful, large, direct current output that requires no amplification whereby high accuracy may be achieved and maintained.

Another object of the present invention is to provide an improved geothermal heat flux transducer which is uniquely adapted for connection in a series electrical circuit with other like transducers to obtain more meaningful indications of geothermal conditions than has heretofore been possible.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 5 illustrates the construction and nature of the individual thermopile units and their interconnection, the actual transducer of FIG. 1-4 having more than the six thermopile units shown in Figure.

FIG. 6 illustrates portions of the two thermopile units with a portion of a typical spaces interposed in final assembly.

FIGS. 7 and 8 are perspective views illustrating other form of the transducer, each of which is provided with a pair of carrying handles.

The transducer illustrated in FIGS. 1-6 includes a multiplicity of thermopile units 10 positioned and interconnected with each other in a unique manner with an insulatory spacer 11 sandwiched as illustrated in FIG. 6 between adjacent units 10.

Figure 4:
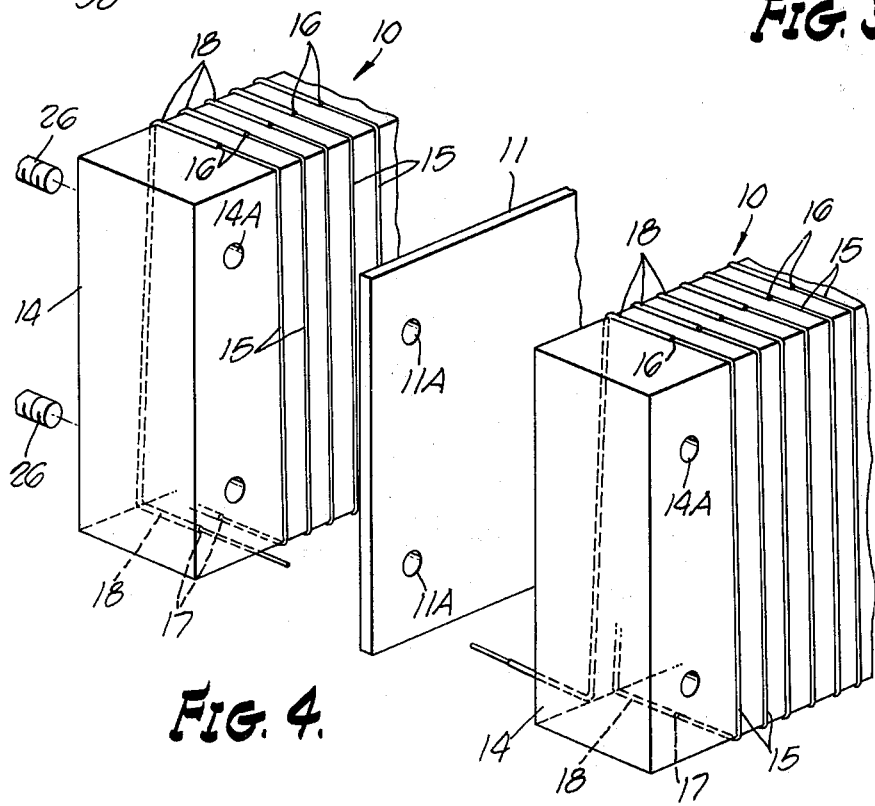
FIG. 4 is a perspective view of portions of the internal construction of the transducer in FIG. 1-3.

Each thermopile 10 as seen in FIG. 4 involves the use of a rectangular bar or slab of insulating material referred to as a core 14 around which a multiplicity of spaced turns of wire 15 is wound. The wire 15 may be constantin. After winding, a silver coating 18 is applied to one-half of each wire turn so as to produce a pair of junctions 16, 17 per turn where the silver coating 18 on each wire turn terminates. The junctions 16 are referred to as hot junctions, and the other junctions are referred to as cold junctions 17.

Preferably the silver coating 18 is formed by electrodeposition in which case a slab 14 with wire 15 wrapped around it is immersed to only one-half of its thickness in a silver solution so that when voltage is applied to electrodes in the silver bath, a silver coating is applied to only the immersed portion of each wire turn.

The individual thermopile units 10 in their final assembled condition as illustrated are so related that the silver coating 18 on one unit 10 faces the silver coating 18 on an adjacent unit 10 and the uncoated wire 15 on one unit 10 faces the uncoated wire 15 on an adjacent unit. As seen in FIG. 5, adjacent facing uncoated wire ends on adjacent cores 14 are interconnected by a wire 20 at one end of the core 14 and adjacent facing silver coated ends on adjacent cores are interconnected by a wire 21 at the other end of the core 14.

The individual thermopile units are thus connected in a series circuit wherein the individual voltage developed between corresponding cold and hot junctions on the same wire turn in each unit 10 is in voltage adding relation and the output leads for the composite thermopile are the leads 23, 24.

Figure 1:
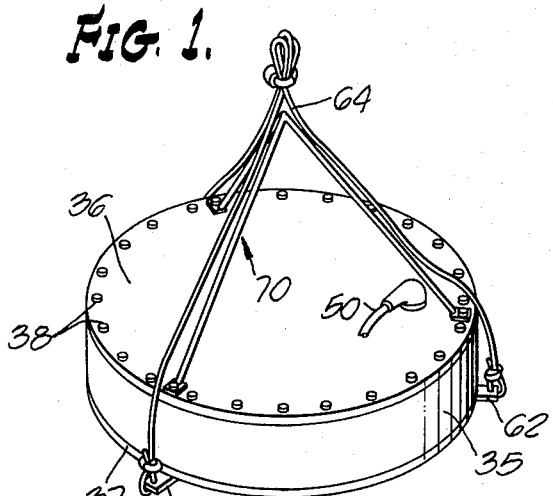
FIG. 1 is a perspective view illustrating one form of geothermal transducer constructed in accordance with features of the present invention.
Figure 2:
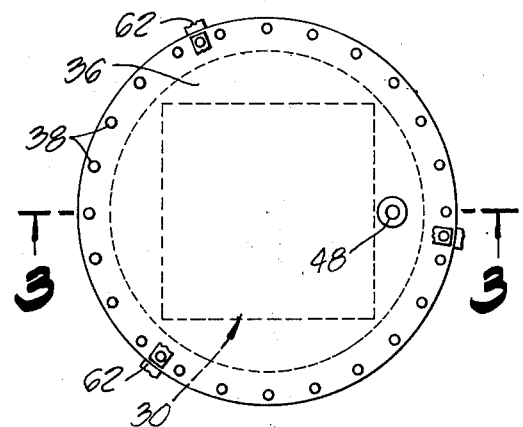
FIG. 2 is generally a top plan view of the same with internal construction indicated by dotted lines.
Figure 3:
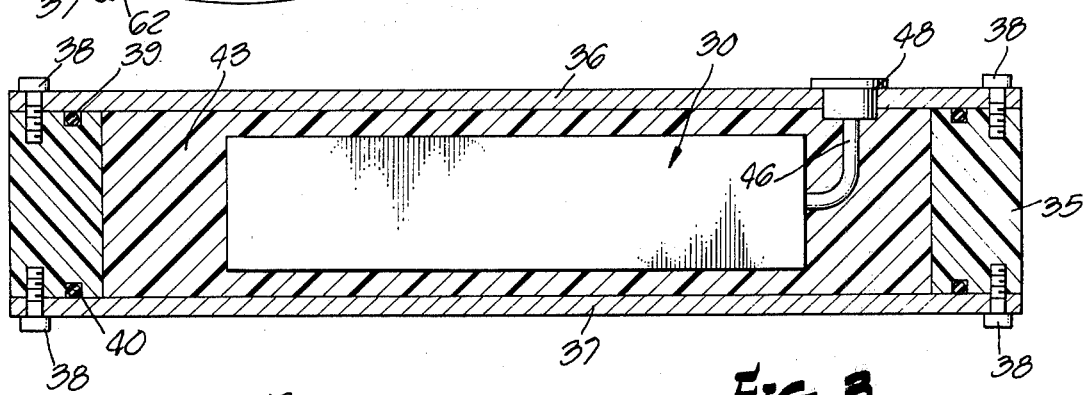
FIG. 3 is a sectional view taken substantially on line 3—3 of FIG. 2.

The assembly of units 10 into a composite thermopile referred to generally as 30 is suitably housed. In FIGS. 1, 2 and also in FIG. 7, the housing is circular and is formed by a short tubular housing element 35 which is closed at opposite ends by disc-shaped housing elements 36, 37 such elements 36, 37 being secured using a series of bolts 38 with a sealing O-ring 39, 40 squeezed therebetween. Preferably a filter material, such as a conventional potting compound 43, fills the space between the composite thermopile 30 and its housing 35, 36, 37 with the output lead wires 23, 24 (FIG. 5) being a part of a cable 46 which terminates at a conventional electrical connector 48 mounted on closure plate 36 for reception of a connecting cable 50 (FIG. 1). This cable connection 50 may also be located on the arcuate side of the transducer.

The housing 35, 36, 37 in FIG. 1 is adapted to be supported by cable in, for example, a bore hole whereas the housing in FIG. 7 is intended to be used above a surface and is thus provided with carrying handles 52, 53. In FIG. 1 three cable brackets 62 on lower closure plate 37 have support cable 64 attached thereto and to assure predetermined location of such cable which might otherwise interfere with thermal conditions that affect the transducer a cable guide structure 70 comprising rigid wire extending parallel with the three cables is secured at three locations on the upper closure plate 36 and terminate at an apex as illustrated. The cable 64 may be secured to this guide structure 70 to prevent the possibility of any part of the cable resting on the closure member 36 and thus unpredictably changing, however slightly, thermal conditions in the vicinity of the transducer.

Instead of the housing being circular, the same may be generally rectangular, as defined by the three elements 72, 73, 74 in FIG. 8 with a pair of carrying handles 76 on housing element 72.

As an example, the core members 14 in the form of slats may be 3 inches high designated by the dimension T in FIG. 4, 1 inch wide designated by the dimension W and 12 inches long designated by the dimension $b$ in FIG. 5. The spacers 11 may be one sixty-fourth of an inch in thickness and be of fiber glass or bakelite. The wire may be 0.005 inches in diameter with approximately 400 cold and 400 hot junctions in one unit 10, and there may be twelve such units 10 with a resulting number of approximately 4,800 cold junctions and 4,800 hot junctions.

It is noted that the vertical temperature gradient in the upper layers of the earth's surface changes from a time-dependent function (which reflects diurnal and seasonal variations) near the earth's surface to constant values which characterize the geothermal fluxes at greater depths. When a geothermal heat flux transducer is located below the upper transient heat flow layer, say in a mine tunnel or a filled hole, the geothermal heat flux in that area can be measured with such a transducer. It usually takes several days for a steady state to be reached after the transducer has been positioned. When the geothermal heat flux transducer is located at the earth's surface, it measures the complicated transient diurnal and seasonal heat flux variations in operation. These flux levels are several magnitudes greater than the geothermal flux. It is possible, however, to obtain geothermal heat flux measurements at the earth's surface by covering the transducer with a large blanket containing thermal resistance and capacitance, similar in magnitude to those values for the earth layers that would lie over a transducer positioned in a shallow mine tunnel.

The drawings are intended to show the preferred form of the invention wherein the wire is wound on the individual cores in the same direction and this may be accomplished in a winding process wherein the cores are all initially axially aligned and the wire is then wound successively on the aligned cores, all in the same winding direction, with, however, sufficient length of wire in the form of slack being between adjacent cores to that subsequently the individual cores may be positioned relative to each other in side by side relationship as shown in the drawings.

The novel concepts and constructions are particularly useful in developing additional energy sources, in locating and surveying geothermal reserves under the ground. The special constructions and applications of heat meters described herein are capable of increasing the effectiveness of identifying and qualifying potential geothermal reserves.

It will be seen that the geothermal heat flux transducer, in general, consists of a central core, which contains a multiplicity of elements in the form of a thermopile that measures the temperature gradient across a fixed thermal resistance which mounts the thermopile winding, and a guard ring or zone that surrounds the core so that unidirectional heat flow exists in the core. This fixed thermal resistance is the thermal resistance of the material of the core 14 and the guard ring is that potting compound 43 that surrounds core 14. The temperature gradient through the core 14, which is measured in terms of a thermopile output voltage, is proportional to the heat flux flowing between the hot and cold junctions in the direction and through the distance designated by the distance T in FIG. 4. Special unique dimensional proportions are embodied for attainment of enhanced core sensitivity. For this latter purpose the thermopile elements are narrow and very thick (contrary to elements of previous transducers) and are stacked together in a core matrix that has a good aspect ratio. The core and guard ring are then sealed in a special waterproof housing that has unique features and assures that long practical life which is essential.

The term aspect ratio refers to the ratio, T/w which in this specific example is 3/1 equals 3. Preferably this ratio T/w is within the range of 1 to 6. In a typical prior art transducers for general use this ratio is much less than one and in a typical instance the comparable T is 1/16 inch (one-sixteenth inch) and the associated w is 1 in which case the ratio is 1/16.

The potting compound 43 serves dual functions one of which is to provide a guard ring or zone for minimizing or eliminating heat flow fringing, i.e., to assure parallel heat flux lines through the core.

The resistance of the core material and resistance of the guard zone is preferably substantially the same and also similar to the surrounding earth strata.

Also from the foregoing it is seen that the ratio T/b = 3/12 = 0.25. This ratio of T/b is preferably within the range of 0.1 to 0.5. This prefered ratio T/b like the other ratio T/w is also substantially higher than taught by the prior art where a typical ratio is 1/16 /4 = 1/64 = 0.016.

These high ratios are essential considering the fact that geothermal flux is to be measured in the presence of other heat flow occassioned by day and night diurnal variations and also longer term variations occassioned by calendar or seasonal variations.

When the geothermal heat flux transducer is located on the floor in a deep mine tunnel (with little or no air flow in the tunnel), the geothermal heat flux may be measured directly. If the heat flux transducer temperature at the time it is put into the mine is close to the mine temperature, a steady state reading may be achieved in from 10 to 20 hours.

When, on the other hand, the geothermal heat flux transducer is used at or near the earth's surface, other factors, discussed analytically below are taken into account under the following headings A, B and C.

A. Transient heat transfer in the upper layers of the earth (near its surface) is occassioned by periodic diurnal and also seasonal periodic surface temperature variations as well as the constant geothermal heat flux coming from great depths.

The analytical representation of periodic boundary temperature variations may classically be expressed in terms of sinusoidal series functions (fundamental and harmonic terms). For the sake of illustrating the principle, consider a semi-infinite solid, i.e., earth with a simple cosine fundamental surface temperature function and a constant temperature-depth gradient that is equal to the geothermal gradient at a great distance below the surface. This boundary value problem is defined by:

$$\frac{\delta T}{\delta \theta} = D \frac{\delta^2 T}{\delta Z^2} \quad \text{(classical conduction equation)} \quad (1)$$

with the following two Boundary Conditions:

$$T = (Z=0, \theta) = T'_o \cos 2\pi \frac{\theta}{\theta_o} + T_o \quad \text{Boundary Condition I} \quad (2)$$

$$\frac{\delta T}{\delta T}(Z=\infty, \theta) = \frac{(q/A)_o}{D\delta C_p} \quad \text{Boundary Condition II} \quad (3)$$

These conditions take into account the geothermal flux with a superimposed periodic surface temperature variation, either periodic diurnal or longer term periodic seasonal.

In accordance with the following nomenclature it will be seen that the expression q/A represents the geothermal gradient:
where
T temperature of the earth at depth Z
Z depth below the earth's surface
$\theta$ time
$\theta_0$ period of the cosine surface temperature function (either diurnal or seasonal as the case may be)
$T_0$ amplitude of the cosine surface temperature function
$T_0$ mean boundary temperature $(q/A)_0$ geothermal heat flux
D thermal diffusivity of earth
$\gamma$ density of earth
$C_p$ heat capacity of earth
The solution to this boundary value problem is $$T = T_o + \frac{(q/A)_o Z}{\gamma C_p D} + T'_o \, e^{-\sqrt{\frac{\pi}{D\theta_o}} Z} \cos\left(2\pi \frac{\theta}{\theta_o} - \sqrt{\frac{\pi}{D\theta_o}} Z\right) \quad (4)$$

and this equation when differentiated with respect to depth appears as equation (5) below and it represents heat flow in the ground.

$$\frac{\delta T}{\delta Z} = \frac{(q/A)_o}{\gamma C_p D} - T'_o \sqrt{\frac{\pi}{D\theta_o}} \, e^{-\sqrt{\frac{\pi}{D\theta_o}} Z} \left[\cos\left(2\pi \frac{\theta}{\theta_o} - \sqrt{\frac{\pi}{D\theta_o}} Z\right) - \sin\left(2\pi \frac{\theta}{\theta_o} - \sqrt{\frac{\pi}{D\theta_o}} Z\right)\right] \quad (5)$$

These equations (4) and (5) show that the periodic temperature and heat flow amplitudes decrease with depth below the earth's surface.

B. With respect to the Thermal R-C Matrix (Blanket) and its Application in order to use a heat flux transducer at the earth's surface to measure the geothermal heat flux at the earth's surface in a manner uninfluenced by diurnal and seasonal variations, the sensor is covered with a matrix of material that contains sufficient thermal resistance and capacitance so that the diurnal and much of the seasonal heat flow variations are damped out. The thermal resistance used in the matrix may consist of any good insulation such as layers of closed cell insulation. The thermal capacitance of the matrix may consist of any material having good capacitance such as water. An important parameter that exists in the analytical damping function of such a matrix or blanket is the thermal diffusivity, $D_m$, which is composed of the thermal resistance and capacitance. The lower the thermal diffusivity, the greater will be the dampening, i.e., a low diffusivity, $D_m$, is desired. It is possible to choose matrix materials that have better thermal resistances and capacitances (and lower diffusivities) than those of earth and rock. Consequently, a relatively thin thermal matrix can be constructed to cover the heat flux transducer. Calculations show that one can damp out a diurnal variation with less than one foot of good low-diffusivity material.

Considering typical ratios of the amplitude of the diurnal heat flow to the geothermal heat flow, at the earth's surface ($Z=0$), this ratio may be as observed from actual measurements, on the order of 2,500. At a depth of two feet ($Z=2$), this ratio may be unity for a representative soil diffusivity. In contrast to diurnal heat flow, in the case of seasonal heat flow the amplitude (maximum value during the period of one year) of the seasonal heat flow to the geothermal heat flow may be of the order of 400 at the earth's surface. In order to reduce this ratio of 400 to unity one has to place the transducer below the earth's surface to a depth of about 30 feet ($Z=30$).

Thus, comparing the diurnal and seasonal variations, in the former case the relativity short periodicity represented by $\theta_0 = 24$ hours involving a ratio of 2,500 may be damped out at about 2 feet but the longer term variations in the latter case represented by $\theta_0 = 365 \times 24 = 8760$ hours involving a ratio of about 400 may be damped out at about 30 feet.

To obtain an accurate measurement of the geothermal heat flux, it is preferred that the amplitude of the periodic heat flow (either diurnal or seasonal) to the geothermal heat flow be less than unity (say, in the range of 0.1 to 0.5). This may be done for the diurnal case by using a three quarter foot thick thermal R-C matrix that has a lower thermal diffusivity than that of the earth. In the annual heat flow case, a thicker matrix is preferably used (say a thickness of about 10 feet). In many cases, such a ten foot thick matrix or blanket is unwieldy. One may use a thinner matrix, however, by choosing the times or time in the calendar year when making the heat flow measurements.

Specifically, as seen from the periodic heat flow equation [equation (5)] there are two time periods during the year when the periodic temperature gradient (or heat flow due exclusively to seasonal variations) at a given depth is zero or nearly so and only the geothermal gradient (or heat flow) remains. It is at such times that geothermal heat flux measurements are preferably made with a thermal matrix or blanket covering a heat flux sensor at the earth's surface, such matrix being used primarily to damp out diurnal variations.

C. With respect to thermal R-C Matrix or Blanket Specifications, in order to obtain a thermal R-C matrix or blanket with a low thermal diffusivity, a mixture of materials is preferably used that has a low equivalent thermal conductivity and a high equivalent thermal capacity per unit volume (i.e., product of the specific heat and density). Closed cell insulating foam and water are two good materials that may be used as the two componets. The foam may be in layer form with water in between the layers or the foam may be in the form of spheres, submerged in a flat tray of water. These materials may be arranged in a number of different ways, for example, thin walled plastic tubes or flat channels sealed at the ends and filled with water may be deployed in one or more layers covered or separated by one or more layers of closed cell foam insulation sheets. The water may also be contained in flat rubber bags similar to water mattresses. When such a mixture is assembled (say, for equal volumes of insulation and water), the resulting ratio of equivalent thermal conductivity to the product of equivalent specific heat times density (thermal diffusivity) is about eight times less than a representative diffusivity for earth. Analyses for the properties of the two-componets thermal matrix are outlined as follows:

The equivalent thermal conductivity $k_{eq}$ for a two-component, e.g., water and foam, layered mixture matrix or blanket may be represented by the following equation (6):

$$k_{eq} = \frac{1}{\frac{\nu_1}{k_1} + \frac{\nu_2}{k_2}} \quad (6)$$

where $\nu_1$, $\nu_2$, volume fractions of the two-componets
$k_1$, $k_2$, thermal conductivities of the two-components
The equivalent thermal capacity per unit volume (product of specific heat times density, $C_p \gamma$) for a two componet mixture is:

$$(C_p \gamma)_{eq} = \nu_1 C_{p1} \gamma_1 + \nu_2 C_{p2} \gamma_2 \quad (7)$$

where $C_1 \gamma_1$, $C_2 \gamma_2$, are the thermal capacities per unit volume of the two-components. The subscript 1 refers to air and the subscript 2 refers to water.
For $\nu_1 = \nu_2 = 0.5$,
$k_1 = 0.02$ Btu/hr ft °F, $k_2 = 0.35$ Btu/hr ft °F
$\gamma_1 = 0.08$ lbs/ft$^3$, $\gamma_2 = 62$ lbs/ft$^3$
$C_1 = 0.25$ Btu/lb °F, $\tau_2 = 1.0$ Btu/lb °F
These values when substituted in equations (6) and (7) result in:
$k_{eq} = 0.038$ Btu/hr ft °F
$(\tau_p \gamma) = 32$ Btu/ft$^3$ °F
$D_{eq} = 0.038/32 = 0.0012$ ft$^2$/hr
Considering also that:

$$D = \frac{k}{\gamma C_p} \quad D_M = \frac{k_M}{(\gamma C_p)_M}$$

the equivalent diffusivity, $D_{eq}$, is about eight times as low as that for representative earth, which means that the matrix thickness may be about $1/\sqrt{8}$ as thick as an earth layer of equivalent damping in the case of either diurnal or seasonal damping.

While the particular embodiments of the present invention have been shown and described, it will be obvious to those skilled in the art that changes and modifications may be made without departing from the invention in its broader aspects and, therefore, the aim in the appended claims is to cover all changes and modifications as fall within the true spirit and scope of this invention.

We claim:
1. In a system in which it is desired to ascertain the flow of heat from a subterranean geothermal heat source wherein the improvement comprises a generally planar geothermal heat transducer structure encompassing a large area through which heat flux from said source flows and a multiplicity of thermal hot junctions and associated cold junctions uniformly disposed in said structure throughout substantially all of said area, said hot and cold junctions being on a mounting structure which has a vertical dimension in the direction of heat flow at least equal to the horizonal width of the structure and companion hot and cold junctions being spaced a distance equal to said vertical dimension, and means surrounding said mounting structure for preventing heat flux fringing to thereby assure parallel heat flux flow lines through said mounting structure, said mounting structure and said preventing means having substantially the same resistance to heat flow.

2. The combination set forth in claim 1 in which said heat transducer structure is on the earth's surface but is covered by a blanket for substantially minimizing the effects of diurnal and seasonal variations on said transducer.

3. The combination as set forth in claim 1 including a plurality of insulating cores, a wire wrapped around each core to provide a multiplicity of turns of wire around each core, substantially one-half of each of said turns of each core being coated with a different material than that of the wire to produce a hot junction and a cold junction per turn wire on each core, coating portions of said wire on adjacent cores facing each other, uncoated portions of said wire on adjacent cores facing each other, and connecting wires between said cores connecting the hot and cold junctions on all of said cores in electrical series relationship.

4. The combination as set forth in claim 1 in which heat transducer structure has handles for carrying and placing on the earth above said heat source.

5. The combination as set forth in claim 1 in which said heat transducer structure has cable means attached thereto for suspending said structure.

6. The combination as set forth in claim 1 in which said heat transducer structure has means mounted thereon for maintaining said cable means in a predetermined position relative thereto.

7. The combination as set forth in claim 3 including means for supporting said transducer structure.

8. The combination as set forth in claim 7 in which said supporting means includes at least one handle.

9. The combination as set forth in claim 7 in which said supporting means is a cable for supporting said transducer structure.

10. The combination as set forth in claim 3 including a housing for all of said cores and potting compound in said housing and surrounding said cores, said potting compound comprising said preventing means.

11. The combination as set forth in claim 10 in which said housing is circular with means thereon for supporting the same in a circular bore hole.

12. The combination as set forth in claim 3 in which said cores are in the form of slats on which said wire is wound, insulating strips between said adjacent turns of wire on adjacent slats, and a generally rectangular housing in which said slats and strips are housed.

13. The combination set forth in claim 1 in which said hot junctions and cold junctions are mounted on said mounting structure with an aspect ratio in the range of one to six.

14. The combination as set forth in claim 13 wherein said mounting structure has a heat resistance which is similar to that of the surrounding earth strata.

15. The combination as set forth in claim 13 wherein said mounting structure is surrounded by a material that has a heat resistance similar to that of the surrounding earth strata and functions as a guard ring or zone for minimizing heat flow fringing.

16. The combination as set forth in claim 1 in which said mounting structure has a horizontal length greater than said vertical dimension.

17. The combination as set forth in claim 1 in which the ratio of said vertical dimension to said horizontal length is within the range of 0.1 to 0.5.

18. The combination as set forth in claim 2 in which said blanket has a relatively small heat diffusivity and has a thickness less than one foot.

19. The combination as set forth in claim 18 in which said blanket is a mixture of materials having a low equivalent thermal conductivity and a high equivalent thermal capacity in the order of 0.038/32 Btu/hr.ft. °F and 32 Btu/ft.$^3$ °F.

20. In a system in which it is desired to ascertain the flow of heat from a subterranean geothermal heat source wherein the improvement comprises a generally planar geothermal heat transducer structure encompassing a large area through which heat flux from said source flows and a multiplicity of thermal hot junctions and associated cold junctions uniformly disposed in said structure throughout substantially all of said area, said hot and cold junctions being on a mounting structure which has a vertical dimension in the direction of heat flow at least equal to the horizontal width of the structure and companion hot and cold junctions being spaced a distance equal to said vertical dimension, said heat transducer structure being on the earth's surface but being covered by a blanket for substantially minimizing the effects of diurnal and seasonal variations on said transducer, said blanket having a relatively small heat diffusivity and has a thickness less than one foot said blanket being a mixture of materials having a low equivalent thermal conductivity and a high equivalent thermal capacity, said mixture being closed cell insulating foam and water.

* * * * *